INVENTORS
Walter G. Roman and
Robert H. Best.
BY
Ralph H. Swingle
ATTORNEY

Aug. 15, 1950  W. G. ROMAN ET AL  2,519,289
PROTECTIVE DEVICE
Filed Jan. 29, 1944   3 Sheets-Sheet 3

WITNESSES:
C. J. Weller.
A. T. Stratton

INVENTORS
Walter G. Roman and
Robert H. Best.
BY
Ralph H. Swingle
ATTORNEY

Patented Aug. 15, 1950

2,519,289

UNITED STATES PATENT OFFICE 2,519,289

PROTECTIVE DEVICE

Walter G. Roman, Wilkinsburg, and Robert H. Best, Greensburg, Pa., assignors to Westinghouse Electric Corporation, East Pittsburgh, Pa., a corporation of Pennsylvania Application January 29, 1944, Serial No. 520,208

22 Claims. (Cl. 200—115)

This invention relates generally to protective devices for electric circuits and apparatus, especially to novel arangements of a plurality of such devices, and in one particular aspect to novel fuse constructions.

In nearly all distribution transformer installations, it is necessary to provide a fuse for clearing transformer faults and transformer secondary faults, and an over-voltage protective device is also required to afford protection against over-voltages such as those caused by lightning.

Since but a limited space is usually available for mounting such devices on a pole top, cross arm, or on the transformer itself, one object of this invention is to provide a simplified unitary mounting of a fuse and over-voltage protective device.

More specifically, it is an object of this invention to provide a novel unitary assembly and interconnection of a high-voltage fuse and over-voltage protective device.

Another object of this invention is to provide novel means for mounting a high-voltage fuse on an over-voltage protective device and for electrically interconnecting the two devices.

Still another object of this invention is to provide a novel type of high-voltage fuse which is capable of automatically dropping out of the circuit in response to a circuit-interrupting operation.

Another object of this invention is to provide a novel form of dropout fuse which is normally enclosed in a casing of insulating material, and is movable outwardly through an opening in the bottom of the casing in response to a circuit-interrupting operation.

These and other objects of this invention will become more apparent upon consideration of the following detailed description of preferred embodiments thereof, when taken in connection with the attached drawings, in which.

Figure 1:
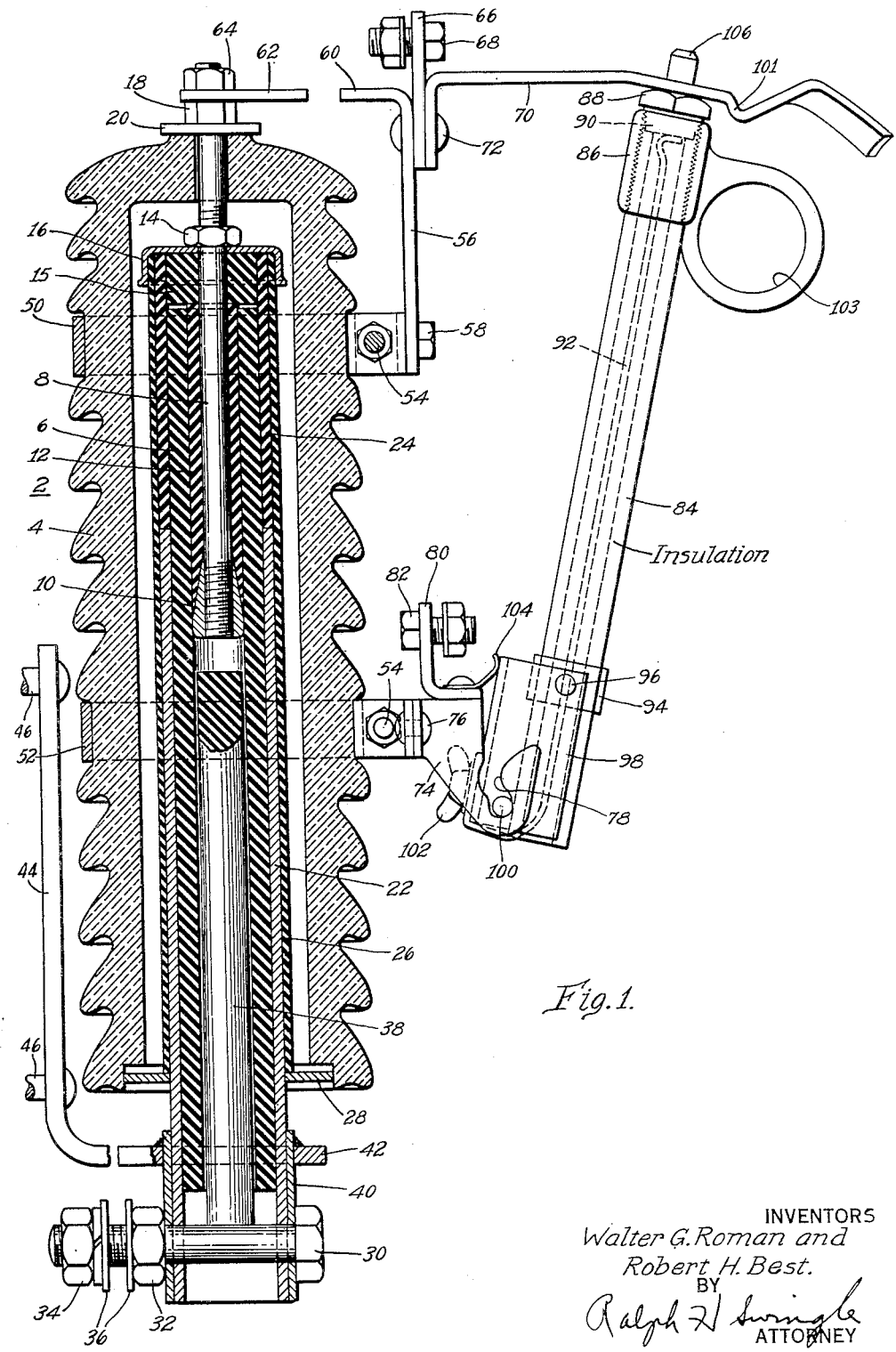
Figure 1 is a side-elevation view of a unitary assembly of an over-voltage protective device and fuse constructed in accordance with this invention, with the protective device shown in section.

Referring to the drawings, there is shown in Fig. 1 an over-voltage protective device 2, and although the protective device illustrated is of the tube type, it should be distinctly understood that other forms of over-voltage protective devices may be used, such for example as any conventional type of lightning arrester. The over-voltage protector 2 illustrated, is of a conventional type, and comprises, in general, an outer casing 4 of insulating material, preferably a weather-proof insulating material such as porcelain or the like. Casing 4 is generally tubular in form, and has a closed upper end and an open lower end. Within insulating casing 4, the protector tube assembly is suspended, preferably from the top wall of casing 4. The protector tube assembly comprises a small inner tube 6 of insulating material preferably of an insulating material which is capable of evolving an arc extinguishing gas when in proximity with an electric arc, such for example as fiber or a synthetic resin. A terminal rod 8 extends into the upper end of tube 6 and is provided within the tube with an electrode 10, the outer surface of which is tapered as shown to cooperate with the interior taper on the end of a filler tube 12. Filler tube 12 may be wedged in position between terminal rod 8 and tube 6, by taking up on nut 14 provided on an intermediate portion of terminal rod 8. Nut 14 bears upon cap 16 for the protector tube assembly, and this in turn bears on the upper end of filler tube 12 through plug 15. Terminal rod 8 forms the means by which the assembly is suspended within housing 4, because rod 8 extends through an aperture in the closed upper end of housing 4 and is provided with a nut 18 and washer 20 outside of the housing, for securing the protector tube assembly in proper position within housing 4.

A metal reenforcing sleeve 22 is telescoped over tube 6 from a point extending from the region of electrode 10 to the lower end of tube 6. Metal tube 22 acts to reenforce tube 6, and since it is associated with the ground terminal of the protector, it also acts as a shield, preventing exterior flashovers. An insulating sleeve 26 is preferably provided over metal tube 22, and the space above metal tube 22 between shield 26 and tube 6 is preferably filled with a plastic insulating material 24, so that at least the upper end of metal tube 22 is entirely enclosed in insulating material. A sealing disc 28 is provided for the open lower end of housing 4 and this may either be secured to the housing or to tube 22. A bolt 30 is provided through the lower end of metal tube 22, having nuts 32 and 34 thereon with interposed washers 36, for securing a ground conductor thereto. Within tube 6 and positioned below electrode 10, there is provided filler plug 38 of a size slightly smaller than the interior diameter of tube 6, with the filler loosely mounted in tube 6, and preferably of a material which may be the same as that forming tube 6.

At the lower end of metal tube 22 there may be provided a supporting sleeve 40 of conducting material having one leg 42 of a supporting bracket secured thereto, as by welding or the like. The other leg 44 of the angular supporting bracket may be provided with means, such as bolts 46 for mounting the protector device on any suitable support.

With a protective device such as that described above, over-voltages will flashover the gap between electrode 10 and one or more of the conducting parts secured to ground bolt 30, such for example as the bolt itself or the lower end of tube 22. This arc will be forced in close proximity with the interior walls of tube 6 and outer walls of filler 38 so as to be subjected to gases evolved from these two members to readily extinguish the arc when the over-voltage subsides.

For the purpose of providing a unitary assembly of an over-voltage protective device, such as that described above, and a high-voltage fuse, it is preferred to mount the fuse on the protective device, and to this end mounting straps 50 and 52 are secured about casing 4 at spaced points, for example as by bolts 54 passing through the ends of each strap. The upper supporting strap 50 may have the ends thereof angularly directed for the purpose of supporting a contact bracket 56, which may be secured thereto in any desired manner, such for example as by a bolt 58. The upper end of contact bracket 56 is directed angularly toward the protective device to form an electrode 60. A cooperative electrode 62 may comprise a short strap member secured on the outer end of terminal rod 8 of the protector device by a nut 64. Electrodes 60 and 62 cooperate to provide an air gap of predetermined length therebetween to normally maintain the protective device out of the circuit, but being short enough to readily flashover on dangerous over-voltages. A terminal plate 66 provided with a bolt 68 for connection of a line conductor thereto, may be secured to the upper end of contact bracket 56 between the bracket and a resilient line contact member 70, for example as by a rivet 72.

Lower mounting strap 52 on the protective device may also have its outer ends angularly directed in opposite directions, so as to have secured thereto flanges on a generally inverted U-shaped contact member 74, for example as by rivets 76. Each leg of U-shaped contact 74 is extended downwardly and forwardly and provided with a notch 78 for the reception of trunnions for pivotally mounting a fuse thereon. Contact 74 may be provided with an integral terminal extension 80 having a bolt 82 associated therewith for securing a line conductor thereto. The fuse proper comprises a tubular holder 84 of insulating material preferably of an insulating material such as fiber or synthetic resin, which is fairly strong mechanically and is capable of evolving an arc extinguishing gas when in proximity with an electric arc. A terminal ferrule 86 is threaded on the upper end of fuse holder 84 and is provided with a threaded cap 88 for securing the head 90 of a fuse link 92 at the upper end of holder 84. A second ferrule 94 is provided adjacent to but spaced from the other end of fuse holder 84, and there is pivoted to this ferrule as by pivot 96 a supporting link 98 which is generally U-shaped in cross section. The lower end of supporting link 98 is provided with trunnions 100 extending in opposite directions for reception in notches 78 in the legs of contact 74, with trunnions 100 offset from supporting link pivot 96 laterally of the longitudinal axis of tube holder 84. Supporting link 98 is provided with a securing means, such as thumb nut 102, for securing the tail of fuse link 92 thereto. Contact 74 is provided with a resilient contact spring 104, secured to the top thereof and adapted to engage an upper edge of supporting link 98 when the fuse is in closed circuit position. Upper contact 70 is preferably of resilient material and is split to receive guide extension 106 on the upper end of fuse cap 88.

It will be observed that with the tail of the fuse link secured to fuse supporting link 98 as shown on the drawings, relative movement of the support link and fuse holder is prevented as long as the fuse link is intact. Accordingly, fuse holder 84 may be pivotally moved about trunnions 100 into and out of engagement with contact 70, for example as by inserting a hook stick in hook eye 103, integral with terminal ferrule 86. If it is desired to move the fuse to open the circuit from the position shown in Fig. 1, the upper end of cap 88 being generally rounded in convex form, will engage the angled portion 101 of the contact to move it upwardly and permit the fuse to be moved to a depending position with respect to contact 74. The circuit may then be reclosed, merely by moving fuse holder 84 in a counter-clockwise direction from a depending position until cap 88 engages contact 70 and moves it upwardly while stressing the contact to permit movement of the fuse to the position shown in Fig. 1. During closing movement of the fuse, spring contact 104 will be engaged and stressed by supporting link 98 so that this contact will exert a force on the supporting link tending to rotate the supporting link in a clockwise direction about trunnions 100 and in a clockwise direction about pivot 96, so long as the upper end of the fuse holder is held. Rotation about pivot 96 is restrained by the fuse link, as previously pointed out. Contact 70 having been stressed when the fuse is moved to closed circuit position, exerts a force longitudinally downwardly along the fuse holder, and because pivot 96 is offset outwardly from trunnions 100, it will also tend to break the toggle formed by the fuse holder and supporting link 98. Accordingly, when the fuse blows, supporting link 98 will rotate in a clockwise direction about trunnions 100 and because rotation will also occur relative to the fuse holder about pivot 96, the lower end of the fuse will be moved outwardly and downwardly to drop cap 88 from engagement with contact 70. As soon as this occurs the entire fuse may then move about trunnions 100 to a depending position.

The particular fuse described above is, in general, a conventional type of dropout fuse, but it will be observed that it is entirely supported by the over-voltage protective device 2, not only from a mechanical standpoint but the manner of support also provides for electrical connection of both devices in the circuit. This particular assembly of protective device and fuse provides a compact arrangement of these two devices which may be supported as a unit on a pole top, cross arm, or transformer casing; moreover, this unit provides protection of the circuit against over-voltages which will break down the gap between electrodes 60 and 62 and the gap within protective device 2, to be extinguished in the manner previously described. Ordinary overloads are taken care of by blowing of the fuse. Consequently, it will be observed that this particular arrangement of these two devices into a unitary assembly occupying but little more space than that required by either device alone effects a substantial saving in space and materials. It will be noted that the fuse is entirely supported on the outer insulating casing 4 for the protective device 2 so that this casing forms the insulation for the fuse mounting, and also insulates these mountings from the ground and line terminals of the protector device. Furthermore, it will be observed that the entire structure may be mounted on a support such as a cross arm or the like by a single mounting bracket secured to the ground terminal of the protector device.

Figure 2:
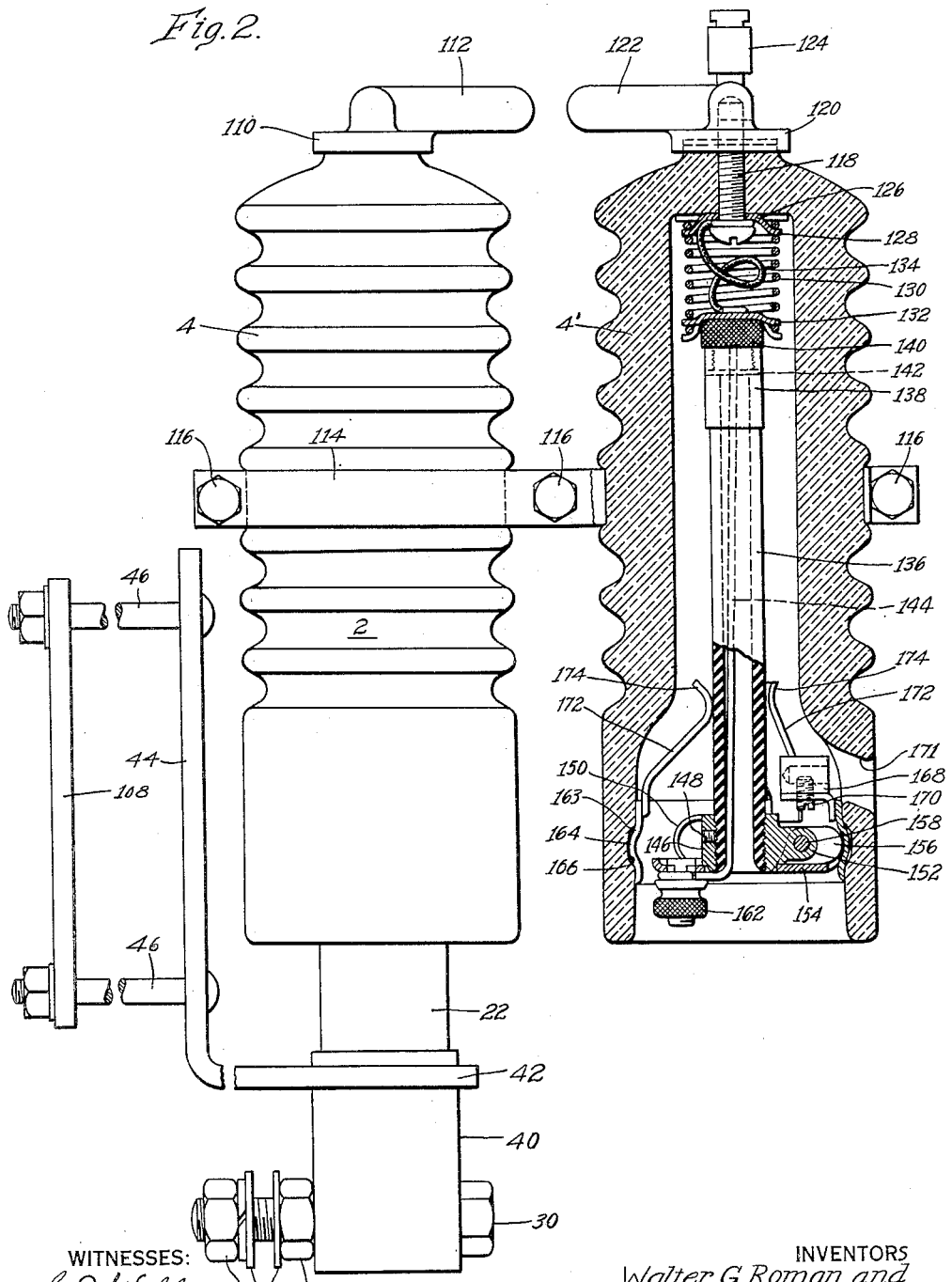
Fig. 2 is a side-elevation view of an assembly like that in Fig. 1 but illustrating a modified form of fuse in section.

In Fig. 2 there is illustrated another unitary assembly of protective device and fuse, and since most parts of the protective device illustrated in Fig. 2 are identical with those described in detail in connection with Fig. 1, like reference numerals are used to designate such like parts. A clamping bar 108 is shown for cooperation with supporting member 64 of the protective device for securing the structure in operative position on a cross arm. The line terminal of the protective device shown in Fig. 2 differs from that shown in Fig. 1 in that terminal rod 8 in this embodiment of the invention is provided with an integral head 110 having an integral laterally extending electrode 112 thereon. Also, instead of requiring a pair of supporting members for the fuse, the fuse in this instance is supported from the protective device by a supporting means comprising a pair of metal straps 114 each of which is formed with two half-round sections adapted to seat about the insulating casing 4 of the protective device and fuse, with the straps secured together at three points as by bolts 116.

The fuse illustrated in this embodiment of the invention uses a casing 4' of insulating material, which may be substantially identical with that used for the over-voltage protective device. The fuse housing 4' is provided with an aperture in its closed top wall for receiving a terminal stud 118, adapted to be threaded into a cap 120, to secure the cap in operative position at the upper end of fuse housing 4. Cap 120 is provided with an integral laterally extending electrode 122 adapted to cooperate with the electrode 112 of the protective device to form an air gap therebetween of a predetermined length. Cap 120 is also provided with a connector 124 for securing a line conductor thereto. Within fuse housing 4', terminal stud 118 is adapted to support a spring supporting plate 126 between the head of the stud and the upper end wall of housing 4. Supporting plate 126 is provided with downwardly bent parts 128 for securing one end of the coil compression spring 130, in fixed position at the upper end of the fuse housing. Spring 130 has a contact plate 132 secured thereto at its other end, and the contact plate 132 may be substantially the same in structure as supporting plate 126. A flexible shunt 134 is soldered or otherwise secured to contact plate 132 at one end and the other end received beneath the head of terminal stud 118 for providing a low resistance electrical connection between contact plate 132 and stud 118.

A tubular fuse holder 136 of insulating material, preferably of the same material comprising fuse tube 84, shown in Fig. 1, is adapted to be mounted within fuse housing 4. The fuse holder is provided at its upper end with a terminal ferrule 138 secured thereto in any desired manner, and a cap 140 is adapted to be threaded into the outer end of ferrule 138 for securing the head 142 of a fuse link 144 to ferrule 138. The lower end of fuse holder 136 has a terminal fixture 146 threadedly mounted thereon and maintained at an adjusted position, for example, as by a set screw 148. Terminal fixture 146 is provided at one side thereof with a pair of spring contact arms 150 extending outwardly therefrom, and secured thereto, for example as by screws 151. Contact arms 150 are shown to be spaced apart substantially 120°, but this is merely illustrative, and it will be apparent that other spacing and arrangement of these spring contact arms may be used within the purview of this invention. Terminal fixture 146 is provided with a reduced extension 152 at the opposite side thereof on which is pivotally mounted a contact pressure plate 154. The contact pressure plate is generally triangular in shape with the edges thereof deflected upwardly, and at the base of the triangle the pressure plate is provided with a reduced projection 156, generally channel shaped in form, which receives the reduced extension 152 of terminal fixture 146, to be pivotally mounted thereto as by pivot pin 158. Contact pressure plate 154 is apertured in alignment with the open lower end of fuse tube 136, and this aperture is made sufficiently large so that it may be used as a hook-eye for manual manipulation of the fuse. The contact pressure plate 154 is also provided with a terminal nut 162 for securing the tail of fuse link 144 thereto, to normally maintain the pressure plate at the position shown on the drawings.

Fuse housing 4' is provided adjacent the lower open end thereof with a split contact ring 163 having a peripheral bulge 164 therein for locking engagement with an annular groove 166 provided in the interior wall of fuse housing 4'. The contact ring 163 may support a terminal connector 168 having a socket for the reception of a line conductor therein and a screw 170 for securing the conductor in the socket. Connector 168 has its socket secured in alignment with an aperture 171 through the side of the fuse housing 4', so that the line conductor may be led into the housing for connection with connector 168. Contact ring 163 also supports a plurality of leaf spring stop members 172, which extend upwardly and inwardly relative to the fuse holder into close proximity with the fuse holder with their outer ends turned outwardly at 174, for a purpose to be described.

The assembly operates on over-voltage surges such as those due to lightning in the same manner as the assembly in Fig. 1, so that such surges will cause the gap between electrodes 112 and 122 to break down and the surge will be discharged through protective device 2 to ground. Ordinary overloads will, of course, be interrupted by the fuse. The particular fuse holder shown in Fig. 2 when inserted in its casing 4' compresses contact spring 130, and is maintained in the position shown wherein lower spring contacts 150 engage contact ring 163, because the channeled end 156 of the contact pressure plate has a rounded nose adapted to seat in the bulge 164 in contact ring 162, and is of such length as to cause contact springs 150 to be seated under stress in this bulge 164 in the contact ring. Pressure plate 154 is prevented from rotation about its pivot 158 by the connection of fuse link 144 therewith. Accordingly, when the fuse blows in response to currents above a predetermined value, pressure plate 154 is released for movement about its pivot 158, and such movement of the pressure plate in a counterclockwise direction is assisted by contact spring 130. As soon as the pressure plate rotates about pivot 158, the pressure on contact springs 150 is relieved, and the fuse holder may then move downwardly within its housing 4'. This downward movement of the fuse holder continues until terminal ferrule 138 is engaged by stop springs 172, and since the terminal ferrule 138 is of larger diameter than the distance between stop springs 172, downward movement of the fuse holder will be halted at this point. In order to remove the blown fuse for the insertion of a new fuse link, a hook stick may be inserted in the aperture 160 in the contact pressure plate, and pulled downwardly with sufficient force to cam the upper ends of stop springs 172 outwardly, and permit terminal ferrule 138 to pass down between these spring members. The fuse holder may be then fitted with a new fuse link, and reinserted in its housing 4'. In this connection it will be noted that the lower terminal fixture 146 of the fuse holder is provided with a pair of longitudinally extending grooves 176 which, in cooperation with the aperture through pressure plate 154, form channels in which may be received spaced prongs of a manipulating tool which may be used to push the fuse holder up into its casing 4'. During this upward movement of the fuse holder into the casing, stop springs 172 are spread apart by the terminal cap 140 until the terminal passes by these springs, and thereafter terminal cap 140 engages contact plate 132 and spring 130 is compressed until contact springs 150 and the contact pressure plate enter the groove in split ring contact 163.

It will be observed that the fuse in this embodiment of the invention is longitudinally slidable into and out of engagement with the line conductors within fuse housing 4', and upon a circuit-interrupting operation by the fuse, the fuse moves longitudinally downwardly, to a position wherein the terminal cap 140 is spaced from contact plate 132, to provide a safe air gap in the circuit. Moreover, after the fuse has blown, the fuse holder is stopped at a position wherein the lower end projects from the lower end of its housing 4' to provide a clearly visible indication of the operation of the fuse. As described above, the fuse shown in Fig. 2 may be easily removed from its casing 4' and renewed for reinsertion into the circuit in a relatively simple manner.

Figure 3:
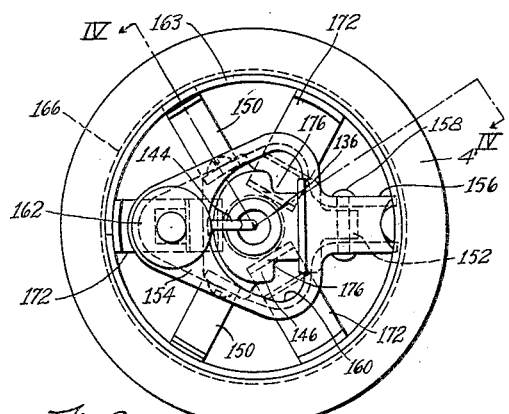
Fig. 3 is an enlarged bottom plan view of the fuse shown in Fig. 2.
Figure 4:
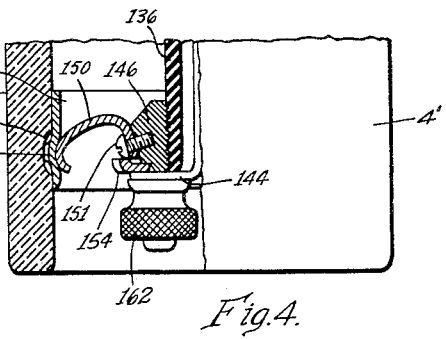
Fig. 4 is a partial cross-sectional view taken substantially on the line IV—IV of Fig. 3.
Figure 5:
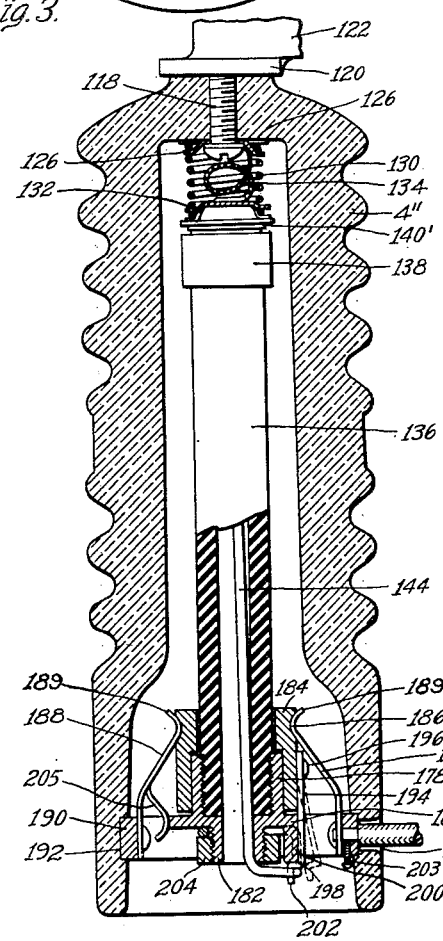
Fig. 5 is a longitudinal cross-sectional view of a modified form of fuse.

In Fig. 5 there is illustrated a fuse quite similar to that illustrated in Figs. 2 to 4, and accordingly, like reference numerals will be used to designate like parts. The fuse shown in Fig. 5 differs from that previously described in that the lower contact ferrule 178 threaded on the lower end of the fuse holder is provided with an intermediate, outwardly extending flange 180, and with a reduced threaded extension 182. A stop sleeve 184 is slidably mounted on ferrule 178, and is provided at its upper end with a peripheral groove 186 which receives the outer ends of a plurality of leaf springs 188. Leaf springs 188 are secured in any desired manner at their lower ends to a split contact ring 190 adapted to be snapped into a groove 192 formed in the inner surface of housing 4'', adjacent the open lower end thereof. The springs 188 extend upwardly and inwardly from contact ring 190, and have their outer ends turned outwardly as at 189 to form convex portions to be received in groove 186 in the stop sleeve. Stop sleeve 184 is normally maintained in the position shown in Fig. 5, by a spring latch 194, secured at its upper end to sleeve 184, as by rivet 196, and having at its lower end a hook portion 198 adapted to be held in engagement with an integral extension 200 on flange 180, by the tail of the fuse link engaged around an extension 202 on the latch, and secured to ferrule 178 by nut 204 threaded on reduced extension 182. The contact ring 190 may be provided with an aperture aligned with an aperture 201 through the side wall of fuse housing 4'' for receiving a line conductor, to be secured therein, for example, as by a screw 203.

When the fuse blows in response to the passage of currents therethrough above a predetermined value, latch 194 is released and since this latch when released will assume the position shown in dotted lines in Fig. 5, it will release the fuse holder for movement relative to stop sleeve 184. This means that contact spring 130 is then free to move the fuse holder downwardly, and this downward movement will continue until the upper terminal ferrule 138 on the fuse engages the upper edge of stop sleeve 184. At this time, contact cap 140' of the fuse will be separated from contact plate 132 a distance sufficient to provide a safe air gap in the circuit, and the fuse will have moved to a position wherein at least the lower end thereof projects below fuse housing 4'' to provide a readily visible indication of the operation of the fuse. Thereafter, the fuse may be entirely removed from housing 4'' by exerting a downward pull thereon sufficient to cause springs 188 to yield outwardly out of groove 186 in the stop sleeve 184. Thereafter a new fuse link may be inserted in the holder and secured beneath nut 204 in the manner shown in Fig. 5, to hold latch 194 in latching position. Thereafter the fuse may be longitudinally reinserted through the open lower end of fuse housing 4'', and springs 188 will snap into position in groove 186 in the stop sleeve when the fuse has been inserted to the position shown in Fig. 5. One or more of springs 188 may be provided with an integral spring contact extension 205 for engaging flange 180 on the lower fuse ferrule as shown in Fig. 5, when the fuse is in its closed circuit position.

Figure 6:
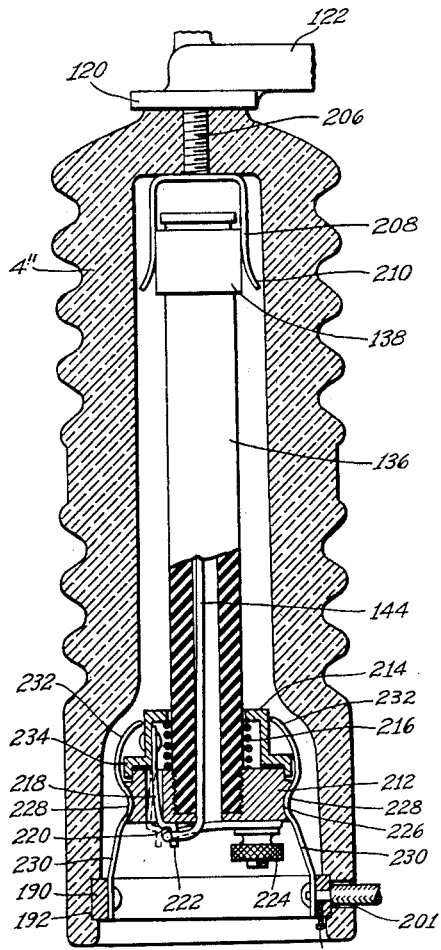
Fig. 6 is a longitudinal cross-sectional view of still another form of modified fuse.

In Fig. 6 there is shown another modified form of fuse which operates in the same manner as the fuse shown in Figs. 2 to 5, and accordingly, like reference numerals will be used to designate like parts. In this embodiment of the invention, the terminal stud 206 which extends through an aperture provided in the closed upper end of fuse housing 4''', may be provided with an integral contact clip 208 for receiving the upper fuse terminal ferrule 138. As shown, the outer ends of the legs of clip 208 are turned outwardly as at 210 for guiding the upper fuse terminal into the clip. The lower end of the fuse holder in this embodiment of the invention is provided with a terminal ferrule 212 threaded on the lower end of the holder, and a stop sleeve 214 is slidably mounted on the holder above the ferrule 212. A coil compression spring is normally held compressed between ferrule 212 and stop sleeve 214 by a spring latch 218, secured to the stop sleeve in any desired manner. Latch 218 is provided with a hook 220 at its lower end adapted to be held in engagement with the outer end of ferrule 212 by the fuse link 144, which engages an extension 222 on the latch and is secured to the terminal ferrule as by a terminal nut 224. The terminal ferrule is provided with a groove 226 in its periphery for receiving inwardly bent convex portion 228 intermediate the ends of leaf contact springs 230. These springs are mounted on a split contact ring 190, and have their upper ends 232 bent inwardly towards stop sleeve 214 for a purpose to be described. The lower end of stop sleeve 214 is enlarged as at 234, also for a purpose to be described.

In the operation of the embodiment of this invention shown in Fig. 6, when the fuse blows, latch 218 is released and will spring out to the position shown in dotted lines. This releases stop sleeve 214 for movement relative to the fuse holder, and the sleeve will be moved upwardly by spring 216, so that the enlarged portion 234 will engage the inclined upper ends of contact springs 230 and move them outwardly. This will remove the inwardly bent portions 228 of the contact springs from groove 226 in terminal 212, and permit the entire fuse holder to be moved downwardly, assisted by spring 216. This downward movement will continue until the upper fuse ferrule 138 engages stop sleeve 214. The stop sleeve is prevented from moving downwardly by the inwardly bent portions 228 of the contact springs engaging with the enlarged portion 234 of the stop sleeve. At this position of the parts, a safe air gap is provided in the circuit and the projecting lower end of the fuse provides an indication of the condition of the fuse, as in the previously described embodiments of the invention. Furthermore, the fuse shown in Fig. 6 may be removed in substantially the same manner as the fuse described in connection with Figs. 2 to 5, in that the fuse may be manually pulled from its housing after it has blown, because the enlarged portion 234 of the stop sleeve will act on the inwardly bent parts 228 of the contact springs, to cause the springs to be cammed outwardly. A new fuse link may then be inserted in the holder and secured to the holder in the manner shown in Fig. 6. The entire structure may then be longitudinally reinserted into the lower open end of the housing to the position shown in Fig. 6 of the drawings.

From the foregoing, it will be apparent that there is disclosed herein novel structural combinations of a high-voltage fuse of the dropout or indicating type and an over-voltage protective device, involving novelty both in the assembly and manner of supporting the parts in mechanical and electrical association. Moreover, this combination is disclosed herein wherein both structures may be housed in identical casings, and the fuse may be of the dropout or indicating type. Furthermore, various types of dropout and indicating fuses have been disclosed wherein the fuse links are used to restrain a latch holding the fuse holder within a generally tubular insulating casing having a closed top so that when the fuses blow the holders are released for movement out through the lower open end of the casing. Moreover, after blowing, the fuses disclosed may be readily removed entirely and refused, and then easily reinserted in the circuit.

Having described preferred embodiments of the invention as required by the patent statutes, it is desired that the invention be not limited to the particular structures described and illustrated herein, inasmuch as it will be obvious, particularly to persons skilled in the art, that many modifications and changes may be made in these particular structures, without departing from the broad spirit and scope of this invention.

We claim as our invention:

1. An assembly of the type described comprising, over-voltage protective means, a tubular casing of insulating material having said protective means therein, spaced terminals for said protective means located adjacent opposite ends of said casing, a fuse, means entirely supporting said fuse from at least one intermediate point on the outside of said casing, and means associated solely with one terminal of said protective means for supporting said assembly, whereby the insulation of the fuse to ground comprises portions of the outside wall of said casing.

2. An assembly of the type described comprising, over-voltage protective means, a tubular casing of insulating material having said protective means therein, a line terminal and a ground terminal for said protective means located adjacent opposite ends of said casing, means attached solely to said ground terminal for supporting said assembly, a fuse, and means entirely supporting said fuse from the outside of said casing intermediate the terminals of said protective means, whereby the insulation of said fuse to ground comprises portions of the outside wall of said casing.

3. An assembly of the type described comprising, over-voltage protective means, a tubular casing of insulating material having said protective means therein, a line terminal and a ground terminal for said protective means located adjacent opposite ends of said casing, line contacts supported on said casing at spaced points intermediate the terminals of said protective means, fuse supporting means mounted on said line contacts, electrodes on said line terminal and the line contact adjacent thereto, and said electrodes extending into proximity to form a spill-over gap of predetermined length.

4. An assembly of the type described comprising, over-voltage protective means, a tubular casing of insulating material having said protective means therein, terminals for said protective means located adjacent opposite ends of said casing, fusible means, a tubular enclosure of insulating material for said fusible means, and means spaced from said terminals directly joining the outer sides said casing and enclosure for supporting said fusible means and protective means in insulated spaced relation.

5. An assembly of the type described, comprising, over-voltage protective means, a tubular casing of insulating material having said protective means therein, a line terminal and a ground terminal for said protective means located adjacent opposite ends of said casing, fusible means, a tubular enclosure of insulating material having said fusible means therein, spaced terminals for said fusible means on said enclosure, and means directly supported on the outside of said casing intermediate the terminals of said protective means for directly supporting said enclosure at a point intermediate said fuse terminals, and electrodes on said line terminal and one of said fuse terminals extending into proximity to form a spill-over gap of predetermined length.

6. An assembly of the type described comprising, a pair of tubular casings of insulating material each having a closed end and an open end, means directly engaging the outer sides of said casings intermediate their ends for securing said casings together in spaced, substantially parallel relation, with the closed and open ends of said casings adjacent each other, supporting means for said assembly associated solely with one of said casings for supporting said casings with their closed ends uppermost, fusible means in one casing, over-voltage protective means in the other of said casings, terminals located adjacent opposite ends of each casing for each of the said means in said casings, respectively, means for attaching conductors to said fuse terminals and the lower terminal of said protective means, and electrodes on the upper terminals of each casing extending into proximity to form a spill-over gap of predetermined length.

7. In a fuse, a tubular housing of insulating material having a closed top end and open lower end, line terminals in said housing adjacent the opposite ends thereof, a tubular fuse holder of insulating material adapted to be inserted longitudinally into said housing through the open end thereof, terminals adjacent opposite ends of said holder for engagement with said line terminals, respectively, when said holder is in operative position in said housing, fusible means in said holder connected between said holder terminals, latch means automatically responsive to longitudinal movement of said holder into said housing for normally maintaining said holder at said operative position, and means controlled by said fusible means for releasing said latch means in response to fusion of said fusible means to permit said holder to drop downwardly through the open end of said housing.

8. In a fuse, a tubular housing of insulating material having a closed top end and open lower end, line terminals in said housing adjacent the opposite ends thereof, a tubular fuse holder of insulating material adapted to be inserted longitudinally into said housings through the open end thereof, terminals adjacent opposite ends of said holder for engagement with said line terminals, respectively, when said holder is in operative position in said housing, fusible means in said holder connected between said holder terminals, resilient means biasing said holder for movement out through the open end of said housing when said holder is at said operative position, latch means automatically responsive to longitudinal movement of said holder into said housing for normally maintaining said holder at said operative position, and means controlled by said fusible means for releasing said latch means in response to fusion of said fusible means to permit said resilient means to move said holder outwardly of the housing.

9. In a fuse, a tubular housing of insulating material having a closed top end and open lower end, line terminals in said housing adjacent the opposite ends thereof, a tubular fuse holder of insulating material adapted to be inserted longitudinally into said housing through the open end thereof, terminals adjacent opposite ends of said holder for engagement with said line terminals, respectively, when said holder is in operative position in said housing, fusible means in said holder connected between said holder terminals, resilient means biasing said holder for movement out through the open end of said housing when said holder is at said operative position, latch means automatically responsive to longitudinal movement of said holder into said housing for normally maintaining said holder at said operative position, means controlled by said fusible means for releasing said latch means in response to fusion of said fusible means to permit said resilient means to move said holder outwardly of the housing, releasable means limiting said downward movement of said holder, and being manually releasable to completely withdraw said holder from the lower end of said housing.

10. In a fuse, a tubular housing of insulating material having a closed top end and open lower end, line terminals in said housing adjacent the opposite ends thereof, a tubular fuse holder of insulating material adapted to be inserted longitudinally into said housing through the open end thereof, terminals adjacent opposite ends of said holder for engagement with said line terminals, respectively, when said holder is in operative position in said housing, fusible means in said holder connected between said holder terminals, resilient means biasing said holder for movement out through the open end of said housing when said holder is at said operative position, latch means automatically responsive to longitudinal movement of said holder into said housing for normally maintaining said holder at said operative position, means controlled by said fusible means for releasing said latch means in response to fusion of said fusible means to permit said resilient means to move said holder outwardly of the housing a distance at least sufficient to disengage said upper fuse and line terminals, releasable means limiting said outward movement of the holder to an amount not less than the aforesaid distance, and being manually releasable to completely withdraw said holder from the lower end of said housing.

11. In a fuse, a tubular housing of insulating material having a closed top end and open lower end, line terminals in said housing adjacent the opposite ends thereof, a tubular fuse holder of insulating material adapted to be inserted longitudinally into said housing through the open end thereof, terminals adjacent opposite ends of said holder for engagement with said line terminals, respectively, when said holder is in operative position in said housing, fusible means in said holder connected between said holder terminals, resilient means biasing said holder for movement out through the open end of said housing when said holder is at said operative position, latch means automatically responsive to longitudinal movement of said holder into said housing for normally maintaining said holder at said operative position, means controlled by said fusible means for releasing said latch means in response to fusion of said fusible means to permit said resilient means to move said holder outwardly of the housing, releasable means mounted on said lower line contact for limiting said downward movement of said holder, and being manually releasable to completely withdraw said holder from the lower end of said housing.

12. In a fuse, a tubular housing of insulating material having a closed top end and open lower end, a line terminal at the closed end of said housing resiliently biased toward the open end of said housing, a second line terminal adjacent the open end of said housing, a tubular fuse holder of insulating material adapted to be inserted longitudinally into said housing through the open end thereof, terminals adjacent opposite ends of said holder for engagement with said line terminals, respectively, and to engage and move said line terminal at the closed end of said housing against its resilient bias during insertion of said holder to its operative position in said housing, fusible means in said holder connected between said holder terminals, latch means automatically responsive to longitudinal movement of said holder into said housing for normally maintaining said holder at said operative position, and means controlled by said fusible means for releasing said latch means in response to fusion of said fusible means to permit said holder to be moved downwardly through the open end of said housing.

13. In a fuse, a line contact structure having an opening, a fuse holder, said holder adapted to be mounted for sliding movement through said opening, fusible means on said holder, terminal means for said holder adapted to normally engage said contact structure and prevent sliding movement of said holder, said terminal means including at least one terminal portion the position of which is fixed relative to said holder and a movable portion disposed substantially opposite said fixed terminal portion, said movable terminal portion normally held by said fusible means at one position wherein it engages one side of the opening in said contact structure to force said fixed terminal portion into pressure engagement with said contact structure at the opposite side of said opening to form a good electrical connection of said terminal means and contact structure and normally prevent sliding movement of said holder, whereby upon fusion of said fusible means said movable terminal portion is released to permit movement thereof to relieve said pressure engagement and allow sliding movement of said holder to separate said terminal means from said contact structure.

14. In a fuse, a line contact structure having an opening, a fuse holder, said holder adapted to be mounted for sliding movement through said opening, fusible means on said holder, terminal means for said holder adapted to normally engage said contact structure and prevent sliding movement of said holder, said terminal means including at least one terminal portion the position of which is fixed relative to said holder and a movable portion disposed substantially opposite said fixed terminal portion, said movable terminal portion normally held by said fusible means at one position wherein it engages one side of the opening in said contact structure to force said fixed terminal portion into pressure engagement with said contact structure at the opposite side of said opening to form a good electrical connection of said terminal means and contact structure and normally prevent sliding movement of said holder, and resilient means biasing said holder for sliding movement, whereby upon fusion of said fusible means said movable terminal portion is released to permit movement thereof to relieve said pressure engagement and allow sliding movement of said holder to separate said terminal means from said contact structure, under the influence of said resilient means.

15. In a fuse, a line contact structure having an opening, a fuse holder, said holder adapted to be mounted for sliding movement through said opening, fusible means on said holder, terminal means for said holder adapted to normally engage said contact structure and prevent sliding movement of said holder, said terminal means including at least one terminal portion the position of which is fixed relative to said holder and a movable portion disposed substantially opposite said fixed terminal portion, said movable terminal portion normally held by said fusible means at one position wherein it engages one side of the opening in said contact structure to force said fixed terminal portion into pressure engagement with said contact structure at the opposite side of said opening to form a good electrical connection of said terminal means and contact structure and normally prevent sliding movement of said holder, whereby upon fusion of said fusible means said movable terminal portion is released to permit movement thereof to relieve said pressure engagement and permit sliding movement of said holder to separate said terminal means from said contact structure, and said contact structure having releasable stop means for limiting said sliding movement of said fuse holder.

16. In a fuse, vertically spaced line contact structures, the upper contact structure having a contact portion resiliently biased downwardly and the lower line contact structure having an opening, a fuse holder, said holder adapted to be mounted for sliding movement through said opening into and out of engagement with said upper contact structure, fusible means on said holder, terminal means adjacent opposite ends of said holder and adapted in the closed circuit position of said holder to engage said contact structures, respectively, with said upper contact structure being stressed, the terminal means engageable with said lower contact structure including at least one terminal portion the position of which is fixed relative to said holder and a movable portion disposed substantially opposite said fixed terminal portion, said movable terminal portion normally held by said fusible means at one position wherein it engages one side of the opening in said contact structure to force said fixed terminal portion into pressure engagement with said contact structure at the opposite side of said opening to form a good electrical connection of said terminal means and contact structure and normally prevent sliding movement of said holder, whereby upon fusion of said fusible means said movable terminal portion is released to permit movement thereof to relieve said pressure engagement and allow sliding movement of said holder to separate said terminal means from said contact structure.

17. In a fuse, a line contact structure having an opening, a fuse holder, said holder adapted to be mounted for sliding movement through said opening, fusible means on said holder, terminal means for said holder adapted to normally engage said contact structure and prevent sliding movement of said holder, said terminal means including at least one terminal portion the position of which is fixed relative to said holder and a pivoted portion disposed substantially opposite said fixed terminal portion, said pivoted terminal portion normally held by said fusible means at a raised position wherein it engages one side of the opening in said contact structure to force said fixed terminal portion into pressure engagement with said contact structure at the opposite side of said opening to form a good electrical connection of said terminal means and contact structure and normally prevent sliding movement of said holder, whereby upon fusion of said fusible means said pivoted terminal portion is released to permit movement thereof to relieve said pressure engagement and permit sliding movement of said holder to separate said terminal means from said contact structure, resilient means biasing said holder for sliding movement, and said pivoted terminal portion having a hook eye for receiving the prong on a hook stick.

18. In a fuse, vertically spaced line contacts, a tubular fuse holder of insulating material, terminals adjacent opposite ends of said holder, fusible means in said holder connected between said terminals, the lower one of said line contacts including annular structure for receiving said holder for sliding movement relative thereto into and out of engagement with the upper line contact, means under the control of said fusible means for normally maintaining said holder at a position wherein said terminals engage said contacts, respectively, so that upon fusion of said fusible means said holder is free to move downwardly to disconnect at least the upper terminal thereof from said upper contact, stop means engageable with the upper terminal of said holder for limiting downward sliding movement of said holder including at least one inwardly extending stop member on said lower contact structure, and said stop member being yieldable to permit longitudinal withdrawal and insertion of said holder relative to said lower contact.

19. In a fuse, vertically spaced line contacts, a tubular fuse holder of insulating material, terminals adjacent opposite ends of said holder, fusible means in said holder connected between said terminals, the lower one of said line contacts including annular structure for receiving said holder for sliding movement relative thereto into and out of engagement with the upper line contact, means under the control of said fusible means for normally maintaining said holder at a position wherein said terminals engage said contacts, respectively, so that upon fusion of said fusible means said holder is free to move downwardly to disconnect at least the upper terminal thereof from said upper contact, stop means engageable with the upper terminal of said holder for limiting downward sliding movement of said holder including a collar slidably mounted on said holder between said terminals, a plurality of inwardly extending yieldable members on said lower contact positioned to prevent movement of said collar relative to said contacts, and said members being yieldable to permit insertion and withdrawal of said holder and collar relative to said lower contact.

20. In a fuse, vertically spaced line contacts, a tubular fuse holder of insulating material, terminals adjacent opposite ends of said holder, fusible means in said holder connected between said terminals, the lower one of said line contacts including annular structure for receiving said holder for sliding movement relative thereto into and out of engagement with the upper line contact, means under the control of said fusible means for normally maintaining said holder at a position wherein said terminals engage said contacts, respectively, so that upon fusion of said fusible means said holder is free to move downwardly to disconnect at least the upper terminal thereof from said upper contact, stop means engageable with the upper terminal of said holder for limiting downward sliding movement of said holder including a collar slidably mounted on said holder between said terminals, a plurality of inwardly extending yieldable members on said lower contact positioned to prevent movement of said collar relative to said contacts, said members being yieldable to permit insertion and withdrawal of said holder and collar relative to said lower contact, and at least one of said yieldable members having an integral contact portion for engagement with the lower terminal of said holder.

21. In a fuse, vertically spaced line contacts, a tubular fuse holder of insulating material, terminals adjacent opposite ends of said holder, fusible means in said holder connected between said terminals, the lower one of said line contacts including annular structure for receiving said holder for sliding movement relative thereto into and out of engagement with the upper line contact, a collar slidably mounted on said holder intermediate said terminals, means biasing said collar for movement toward the upper terminal of said holder, means under the control of said fusible means for normally maintaining said collar adjacent the lower holder terminal, said lower line contact having at least one upwardly and inwardly directed contact member engageable with said lower holder terminal to prevent sliding movement of said holder relative to said contacts, and said contact member having a portion engageable by said collar upon upward movement thereof when said fusible means fuses, to release said lower holder terminal and permit said holder to slide downwardly.

22. An assembly of the type described comprising, over-voltage protective means, a tubular casing of insulating material having said protective means therein, spaced terminals on said casing for said protective means, a fuse, means spaced from said terminals for entirely supporting said fuse from the outside of said casing intermediate said casing terminals, and means associated solely with one terminal of said protective means for supporting said assembly, whereby the insulation of the fuse to ground comprises portions of the outside wall of said casing.

WALTER G. ROMAN.
ROBERT H. BEST.

REFERENCES CITED

The following references are of record in the file of this patent:

UNITED STATES PATENTS

| Number | Name | Date |
|---|---|---|
| 1,939,371 | Spurgeon | Dec. 12, 1933 |
| 2,003,298 | Lemmon | June 4, 1935 |
| 2,098,433 | Schultz | Nov. 9, 1937 |
| 2,137,270 | Crump | Nov. 22, 1938 |
| 2,159,039 | Meyer | May 23, 1939 |
| 2,170,337 | Pittman et al. | Aug. 22, 1939 |
| 2,185,105 | Hill | Dec. 26, 1939 |
| 2,204,320 | Schultz | June 11, 1940 |
| 2,205,928 | Meyer | June 25, 1940 |
| 2,246,193 | Smith, Jr. | June 17, 1941 |
| 2,249,178 | Schultz | July 15, 1941 |
| 2,294,833 | Cooley | Sept. 1, 1942 |
| 2,401,586 | Smith | June 4, 1946 |